(12) United States Patent
Howe et al.

(10) Patent No.: US 8,979,454 B2
(45) Date of Patent: Mar. 17, 2015

(54) FASTENER ANCHOR ASSEMBLY

(76) Inventors: Rich Howe, Pleasant View, UT (US);
Danny Green, West Point, UT (US);
Gary Phillips, Clearfield, UT (US)

( * ) Notice: Subject to any disclaimer, the term of this patent is extended or adjusted under 35 U.S.C. 154(b) by 138 days.

(21) Appl. No.: 13/081,375

(22) Filed: Apr. 6, 2011

(65) Prior Publication Data

US 2011/0243683 A1 Oct. 6, 2011

Related U.S. Application Data

(60) Provisional application No. 61/321,391, filed on Apr. 6, 2010.

(51) Int. Cl.
| | | |
|---|---|---|
| F16B 13/00 | (2006.01) | |
| F16B 37/12 | (2006.01) | |
| F16B 13/08 | (2006.01) | |
| F16B 13/12 | (2006.01) | |
| F16B 37/04 | (2006.01) | |
| F16B 37/00 | (2006.01) | |

(52) U.S. Cl.
CPC .............. *F16B 37/12* (2013.01); *F16B 13/0833* (2013.01); *F16B 13/0866* (2013.01); *F16B 13/124* (2013.01); *F16B 37/043* (2013.01); *F16B 37/005* (2013.01)
USPC ................................ 411/71; 411/55; 411/80.5

(58) Field of Classification Search
USPC ......... 411/15, 44, 57.1, 71–73, 55, 80.5, 182, 411/166, 999, 49–53, 80.6
See application file for complete search history.

(56) References Cited

U.S. PATENT DOCUMENTS

| | | | | | |
|---|---|---|---|---|---|
| 612,316 | A | * | 10/1898 | Downes | 411/55 |
| 1,499,072 | A | * | 6/1924 | Pleister | 411/80.5 |
| 2,448,351 | A | * | 8/1948 | Brush | 411/80.5 |
| 2,788,047 | A | * | 4/1957 | Rapata | 411/182 |
| 3,449,799 | A | * | 6/1969 | Bien | 411/548 |
| 3,560,030 | A | * | 2/1971 | Macks | 403/371 |
| 3,916,480 | A | * | 11/1975 | Smith | 16/383 |
| 4,179,977 | A | * | 12/1979 | van Buren, Jr. | 411/182 |
| 4,293,260 | A | * | 10/1981 | Kojima et al. | 411/44 |
| 4,436,445 | A | * | 3/1984 | Templeman | 403/189 |
| 4,478,545 | A | * | 10/1984 | Mizusawa et al. | 411/80.1 |
| 4,564,324 | A | * | 1/1986 | Leibhard | 411/3 |
| 5,054,953 | A | * | 10/1991 | Mattiolo | 403/11 |
| 5,106,225 | A | * | 4/1992 | Andre et al. | 403/408.1 |
| 5,135,341 | A | * | 8/1992 | Leyder | 411/182 |
| 5,727,355 | A | * | 3/1998 | Mitchell | 52/698 |
| 5,891,115 | A | * | 4/1999 | Hauer et al. | 301/111.01 |
| 5,993,128 | A | * | 11/1999 | Mark et al. | 411/30 |

(Continued)

OTHER PUBLICATIONS

PCT/US2011/031406 International Search Report and Written Opinion, mailed Dec. 27, 2011.

*Primary Examiner* — Flemming Saether
(74) *Attorney, Agent, or Firm* — Kunzler Law Group, PC

(57) ABSTRACT

Described herein are various embodiments of a fastener anchor assembly for securing a fastener includes a base and a recess formed in the base. The recess has a substantially non-circular cross-sectional shape. The assembly further includes an insert positionable within the recess. The insert has a substantially non-circular cross-sectional shape corresponding with the non-circular cross-sectional shape of the recess. Additionally, the insert includes a fastener opening and at least one flexible portion. The flexible portion flexes to engage the recess as a fastener moves through the fastener opening.

14 Claims, 8 Drawing Sheets

(56) References Cited

U.S. PATENT DOCUMENTS

| | | | |
|---|---|---|---|
| 6,186,695 B1 * | 2/2001 | Kuster | 403/297 |
| 6,276,882 B1 * | 8/2001 | Young | 411/60.2 |
| 6,626,626 B2 * | 9/2003 | Hartmann et al. | 411/353 |
| 7,993,084 B2 * | 8/2011 | Hitchcock | 411/45 |
| 2002/0094253 A1 | 7/2002 | Enomoto et al. | |
| 2006/0000959 A1 | 1/2006 | Hansen | |
| 2006/0042053 A1 | 3/2006 | Kawai | |

\* cited by examiner

FASTENER ANCHOR ASSEMBLY

CROSS-REFERENCE TO RELATED APPLICATION

This application claims the benefit of U.S. Provisional Patent Application No. 61/321,391, filed Apr. 6, 2010, which is incorporated herein by reference.

FIELD

The subject matter of this application is related generally to material couplings, and more particularly to an assembly for anchoring material fasteners.

BACKGROUND

Anchors for securing a fastener to a wall are known in the art. For example, some anchors are configured to extend completely through a wall and expand on the opposite side of the wall to prevent pull-out. These types of anchors are particularly useful for drywall and relatively thick-walled applications, but often prove ineffective for relatively thin-walled applications, such as molded plastic components.

For molded plastic components, anchors are not commonly used. Typically, fastener-connections are made in molded plastic components by screwing the fastener directly into the wall of the component without the use of an anchor. In some instances, an internally threaded hole can be formed in the plastic component for threadably engaging a fastener. More common, however, the component does not include a hole and the fastener is forcibly threaded into the solid wall of the component. In such anchorless applications, engagement between fasteners and the component wall provides some fastener pull-out resistance. However, such pull-out resistance is relatively low, for example, between about 60 and 70 pounds in some applications depending on the material and wall thickness of the component. Further, some anchorless applications, particularly those involving plastic components, require a boss or other fastener receiving feature with a relatively thick wall to provide sufficient engagement with the threads of the fastener. Thicker walls are often undesirable in plastic components as they add to the weight and manufacturing cost of the component. Additionally, for plastic components, fastener-component connections are prone to over-tightening during assembly, which can strip the threads formed in the component.

To increase the strength of anchorless connections, some conventional techniques include extending a fastener through both sides of a component, and securing a nut to the fastener to retain the fastener in place. Such "nut-and-bolt" connections may provide a high strength alternative to some anchorless connections. However, this type of "nut-and-bolt" connection is undesirable in applications requiring the absence of fastening features on one side of a component.

SUMMARY

The subject matter of the present application has been developed in response to the present state of the art, and in particular, in response to the problems and needs in the art that have not yet been fully solved by currently available fastener connections. Accordingly, the subject matter of the present application has been developed to provide a fastener anchor assembly and associated apparatus, system, and method that overcomes at least some, if not all, of the shortcomings of the prior art.

Described herein are various embodiments of a fastener anchor assembly for securing two components together. According to some embodiments, the fastener anchor assembly is particularly advantageous when securing components to hollow plastic panels or walls. As defined herein, a hollow panel or hollow wall refers to a panel or wall having a substantially hollow interior. The hollow interior is defined between two spaced-apart sides of the panel or wall. Generally, one representative embodiment of a fastener anchor assembly includes an insert positionable within a recess formed in a hollow panel. In certain implementations, the recess is formed within a protrusion (e.g., boss) extending into an interior of the hollow panel. The insert and recess are configured to prevent the insert from rotating within the recess. In specific implementations, relative rotation between the recess and insert is prevented by a multi-lobular configuration of the recess and insert. A component is secured to the hollow panel by inserting a fastener through the component and engaging the fastener with the insert, and in some implementations, a wall of the boss.

Engagement between the fastener and insert causes a plurality of lobes of the insert to flex outwardly against the recess wall. The outwardly directed pressure applied to the recess wall increases the retention force of the fastener (i.e., the pull-out force necessary to remove the fastener and insert from the recess) compared to conventional fastener-component coupling techniques. In some embodiments, the fastener anchor assembly provides a high pull-out force (e.g., between 180 and 220 pounds in certain implementations), which can be greater than conventional anchorless fastening arrangements (e.g., about 2 to 4 times greater in certain implementations). Further, in some implementations, the boss can include fastener-engaging features configured to promote threadable engagement between the fastener and the boss, which can increase the retention force of the fastener. Also, in certain embodiments, the insert itself can include retention-enhancing features configured to penetrate the recess wall to further increase the retention force of the fastener.

In addition to increasing the retention force of the fastener, in some embodiments, the fastener anchor assembly of the present disclosure provides a fluid-tight coupling for applications involving a fluid. For example, in certain fluid applications, a fluid desirably is retained within the hollow panel. In such applications, the fluid-tight coupling of the fastener anchor assembly prevents the retained fluid from passing through the coupling. In another example, a fluid desirably is prevented from entering the hollow panel. In such applications, the fluid-tight coupling of the fastener prevents external fluid from entering into an interior of the hollow panel via the coupling.

The fastener anchor assembly of the present embodiment also provides a high retention force without requiring fastening features on both sides of a component. In other words, the fastener anchor assembly is secured to only one side of a component, which effectively hides the connection from the opposite side of the component.

Further, the fastener anchor assembly is configured for use with thin-walled components in certain embodiments. More specifically, the fastener anchor assembly compensates for thinner walls due to its retention force enhancing configuration. Accordingly, the fastener anchor assembly provides a strong retention force without increasing the thickness of the component walls, which facilitates the ability to manufacture a component with less material at lower costs.

In certain embodiments, the fastener anchor assembly reduces thread stripping commonly associated with conventional fastener-component connections on plastic components. Because the fastener anchor assembly requires a relatively high torque to screw the fastener into and through the insert and boss and the tight connection between the insert and the recess, stripping of the plastic component is less likely.

In one specific embodiment, described herein is a fastener anchor assembly for securing a fastener includes a base and a recess formed in the base. The recess has a substantially non-circular cross-sectional shape. The assembly further includes an insert positionable within the recess. The insert has a substantially non-circular cross-sectional shape corresponding with the non-circular cross-sectional shape of the recess. Additionally, the insert includes a fastener opening and at least one flexible portion. The flexible portion flexes to engage the recess as a fastener moves through the fastener opening. The base and insert can be made from a substantially rigid plastic material. When positioned within the recess, the insert can be prevented from rotating relative to the recess.

In some implementations of the assembly, the recess has a multi-lobular shape and the insert has a corresponding multi-lobular shape. The at least one flexible portion can include multiple lobes that are outwardly flexible away from each other. In certain implementations, the recess includes an open end, an opposing closed end, and a sidewall extending between the open and closed ends. The sidewall can diverge in a direction extending from the open end to the closed end. In one specific implementation, the assembly includes a nut that is threadably engageable with the fastener to urge the fastener through the fastener opening.

According to some implementations of the assembly, the flexible portion includes an outer surface and the recess includes an inner surface. The outer surface of the flexible portion presses against the inner surface of the recess to engage the recess. The insert can include at least one lip extending about a periphery of the insert. The lip is configured to penetrate a wall of the recess to engage the recess.

In certain implementations, the base includes a boss and the recess is formed in the boss. The boss can include a substantially conically shaped protrusion and the recess can include a substantially conically shaped portion defined by the substantially conically shaped protrusion of the boss. The conically shaped portion of the recess can be configured to receive the fastener, such that the fastener is engageable with the substantially conically shaped protrusion of the boss.

According to some implementations, the base includes a substantially hollow panel defining an interior cavity. The panel can include a boss extending into the interior cavity and the recess can be formed in the boss.

Based on another embodiment, an insert for securing a fastener relative to a base element includes a fastener opening. The insert also includes a plurality of lobes that define a substantially non-circular outer periphery. The plurality of lobes are outwardly movable away from each other and the fastener opening.

In certain implementations, the plurality of lobes includes at least two interconnected lobes. Each of the plurality of lobes can include a substantially arcuate outer periphery. In some implementations, each of the plurality of lobes includes a separate one-piece component.

According to another embodiment, a method for securing a first element to a second element includes forming a recess in the second element and positioning an insert comprising outwardly movable lobes into the recess. The method also includes inserting a fastener through the first element and between the outwardly movable lobes. Additionally, the method includes actuating the fastener to move the lobes into engagement with the recess.

In certain implementations, the recess is formed in the second element using a blow-molding technique. Actuating the fastener can include driving the fastener into the recess. In some implementations, actuating the fastener includes urging the fastener out of the recess.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
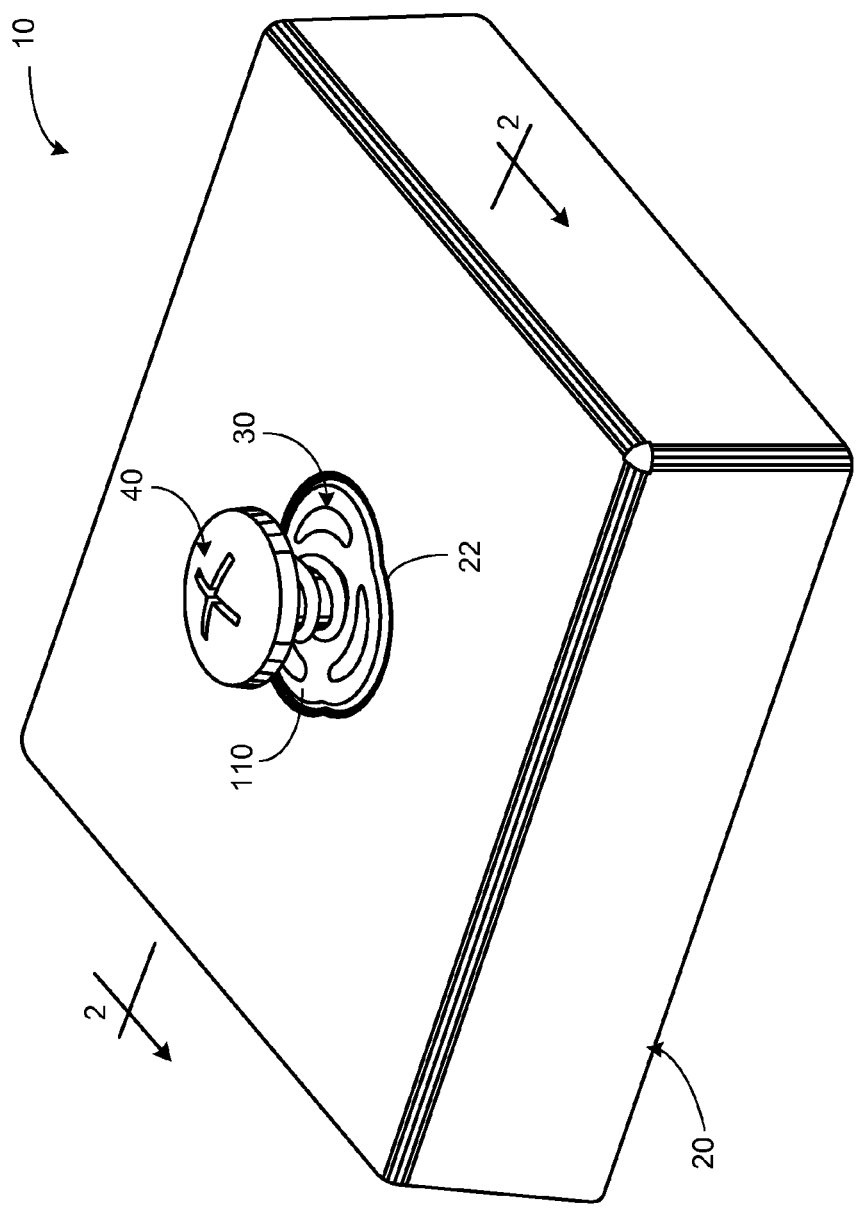
FIG. 1 is a perspective frontal view of an assembled fastener anchor assembly according to one embodiment.

As shown in FIG. 1, one representative embodiment of a fastener anchor assembly 10 includes a base 20, an insert 30, and a fastener 40. The base 20 represents at least a portion of a hollow panel or hollow wall. The insert 30 is positionable within a recess 22 formed in the base 20. The fastener 40 is engageable with the insert 30 to retain the insert within the recess 22. Generally, the fastener anchor assembly 10 is configured to secure a component 12 (see FIG. 2) to the base 20. The component 12 is secured to the base 20 by positioning the component between the base and a head 42 of the fastener 40 and coupling the fastener to the base 20. As the fastener 40 is tightened relative to the base 20, the component 12 is secured between the base and the fastener, which secures the component relative to the base.

Based on the foregoing, the coupling between the fastener 40 and the base 20 acts to secure the component 12 to the base. More specifically, the ability of the fastener anchor assembly 10 to effectively secure the component 12 to the base 20 is based largely on the strength of the coupling between the base 20 and the fastener 40. The strength of the coupling between the base 20 and the fastener 40 can be expressed in terms of the coupling's retention force or its ability to resist pull-out of the fastener relative to the base. In other words, the higher the coupling's retention or pull-out force, the greater the strength of the coupling. The fastener anchor assembly 10 is configured to improve the pull-out force of the fastener-base coupling compared to conventional fastener-coupling techniques. In some instances, the pull-out force provided by the fastener anchor assembly 10 is between two and four times that of conventional fastener-coupling techniques, particularly those techniques used to secure components to plastic hollow panels.

The improved pull-out force of the fastener anchor assembly 10 is at least partially facilitated by the engagement between the insert 30 and the recess 22 of the base 20. Referring to FIGS. 2-5, the base 20 (e.g., hollow panel) includes a front wall 24 with an outer surface 26 and an inner surface 28. As illustrated, the base 20 also includes side walls 50 each with respective outer and inner surfaces 52, 54. For convenience in showing the details of the fastener anchor assembly 10, a rear wall of the base 20 has been removed. Although the base 20 depicted in the illustrated embodiment has a generally planar, square-shaped front wall 24 and generally planar, rectangular-shaped side walls 50, in other embodiments, the base 20 can have any of various shapes and sizes without departing from the essence of the present subject matter. For example, in some embodiments, the base 20 may include only a front wall. Alternatively, the base 20 may include a front wall with more or less than four side walls, and with or without a rear wall.

As depicted, the base 20 includes a partially enclosed interior cavity 56 defined between the front wall 24 and side walls 50. However, in certain implementations, the base 20 includes a rear wall adjoining the side walls 50 such that the interior cavity 56 is substantially fully enclosed. In substantially fully enclosed implementations, the base 20 can be described as a hollow base or hollow panel. In certain applications, a base 20 with a substantially fully enclosed interior cavity 56 can be used to retain a fluid (e.g., water) or other material (e.g., sand). In other applications, a base 20 with a substantially fully enclosed interior cavity 56 can be used to prevent fluids and materials from entering the interior cavity 56 (and/or passing through the base), such as with boats, canoes, or flotation devices. In yet alternative embodiments, the interior cavity 56 is not partially enclosed or substantially fully enclosed, but fully open, such as with a base 20 without side walls or a rear wall. In fully open applications, an interior cavity of the base 20 is defined generally as any space adjacent the inner surface 28 of the front wall 24.

Figure 2:
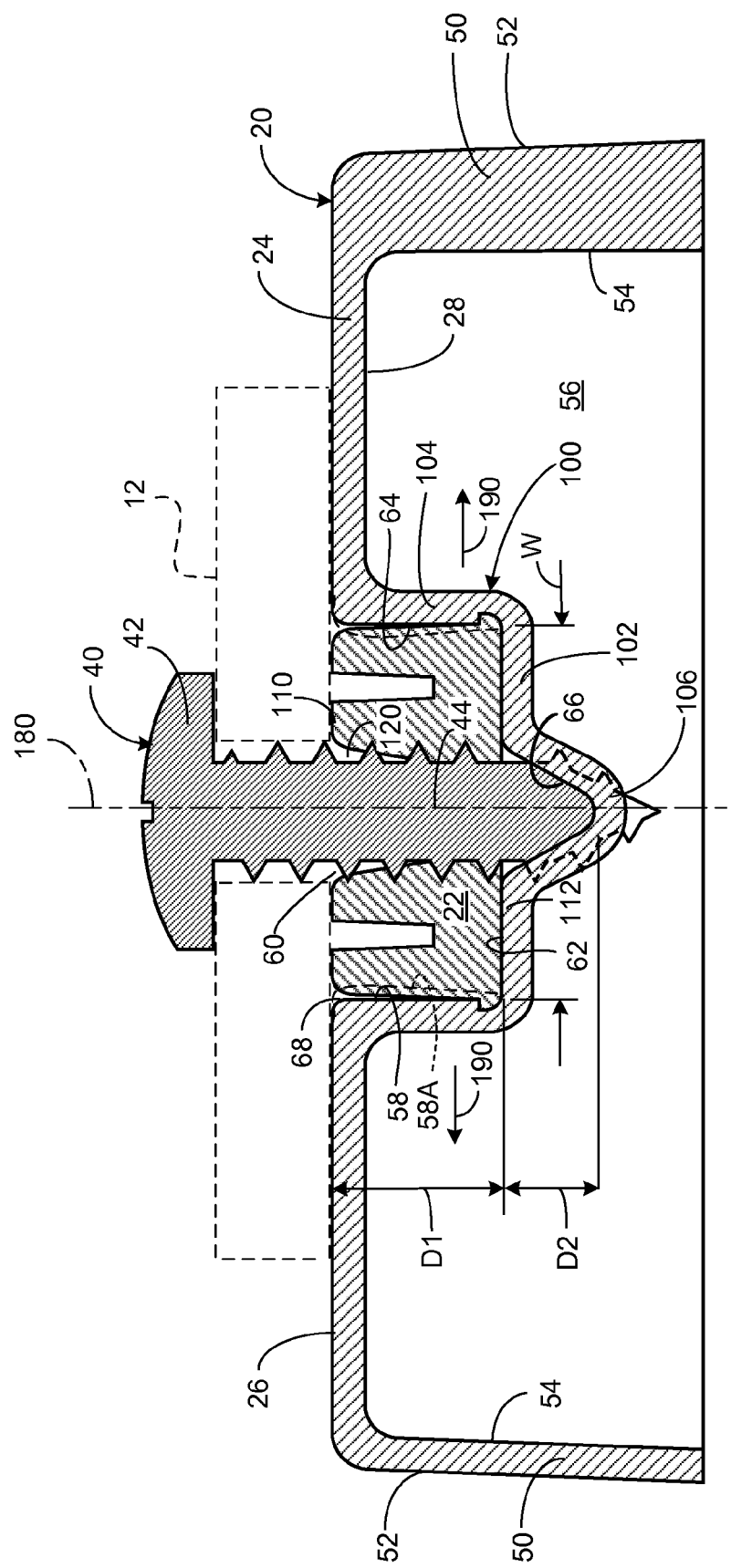
FIG. 2 is a cross-sectional side view of the assembled fastener anchor assembly of FIG. 1 taken along the line 2-2 of FIG. 1.
Figure 4:
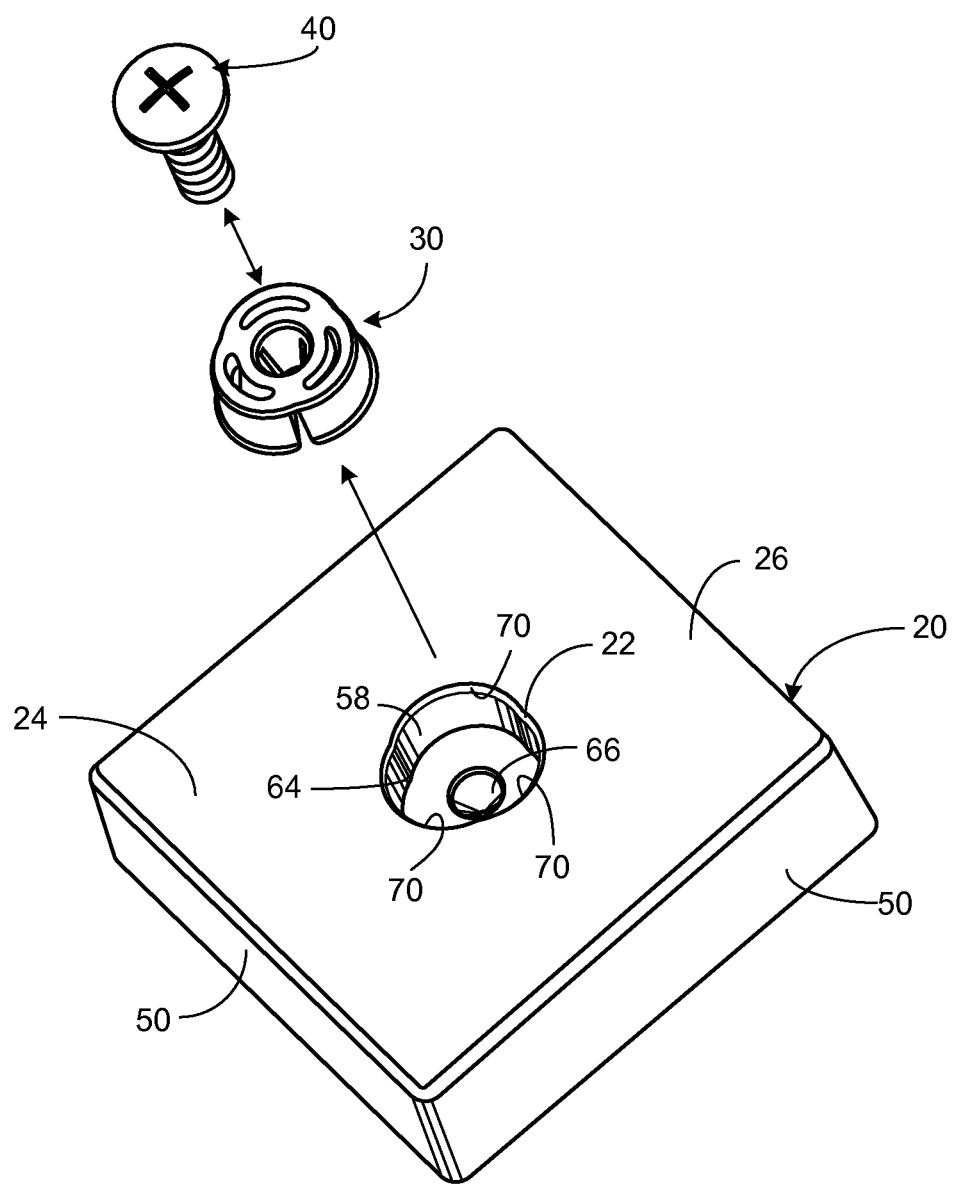
FIG. 4 is an exploded perspective view of a fastener anchor assembly according to one embodiment.
Figure 5:
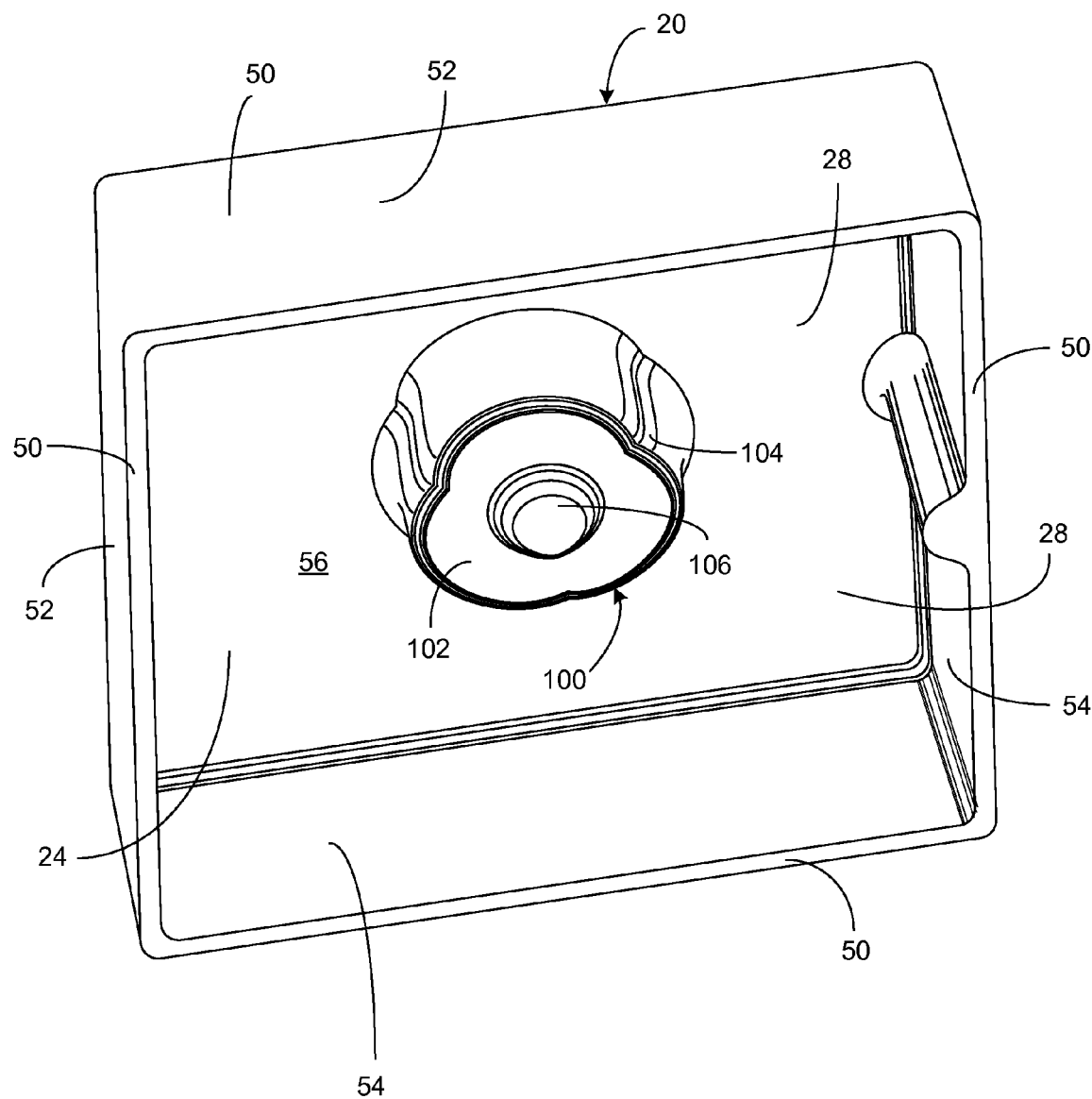
FIG. 5 is a perspective rearward view of a base of a fastener anchor assembly according to one embodiment.

Referring to FIGS. 2 and 4, the recess 22 is formed in the front wall 24 of the base 20. The recess 22 includes a side 58 that extends from an open end 60 adjacent the outer surface 26 of the front wall 24 to a closed end 62 opposite the open end (see, e.g., FIG. 2). In the depicted embodiment, the recess 22 includes an insert receptacle portion 64 and a fastener receptacle portion 66. The insert receptacle portion 64 is configured to matingly receive the insert 30 and the fastener receptacle portion 66 is configured to matingly receive a threaded portion 44 of the fastener 40. Accordingly, the insert receptacle portion 64 preferably has the same outer-peripheral shape as the insert 30. The fastener receptacle portion 66 is shaped to capture the pointed end of the threaded fastener 40. As shown, the fastener receptacle portion 64 has a generally conical shape, although other shapes can be used. The recess 22 has a total depth D equal to a depth D1 of the insert receptacle portion 64 of the recess plus a depth D2 of the fastener receptacle portion 66 of the recess. Further, the recess 22 has a maximum width W defined as the maximum distance between opposing locations on the side 58 of the recess.

Although the recess 22 can have a circular or non-circular shape without departing from the essence of the present subject matter, as shown in FIG. 4, the outer periphery of the illustrated recess 22 (e.g., the insert receptacle portion 64 of the recess), or cross-section of the insert receptacle portion along a plane perpendicular to a central axis of the recess, has a substantially non-circular shape. More specifically, the outer periphery or cross-section of the depicted recess 22 has a trilobular shape. The trilobular shape of the recess 22 divides the recess into three distinct lobe portions 70. In the illustrated embodiment, the outer periphery of each lobe portion 70 is substantially arcuate or curved. Although not necessary, for curved lobes, the outer periphery of each lobe portion 70 has the same radius of curvature, which is smaller than half the maximum width W of the recess. Each lobe portion 70 need not have an arcuate outer periphery. For example, each lobe portion 70 can have an outer periphery with two or more sharply angled surfaces forming a substantially "V" shape such that the outer periphery of the recess 22 has a substantially triangular shape. Although the lobe portions 70 of the depicted embodiment have the same size and shape, each lobe portion 70 need not have the same size and/or shape as the other lobes. Further, although the illustrated recess 22 has three lobes, in other embodiments, the recess 22 can have fewer or more than three lobes.

Referring back to FIG. 2, the side or sidewall 58 of the recess 22 extends substantially perpendicularly relative to the open and closed ends 60, 62 such that an area of the open end 60 is substantially the same as an area of the closed end 62. However, as represented in dashed lines 58A, in other embodiments, the side 58 of the recess 22 can be undercut or angled with respect to the closed end 62 (e.g., diverges in a direction extending from the open end 60 to the closed end 62) such that the area of the open end 60 is smaller than the area of the closed end 62. As defined herein, the side 58 of the recess 22 is undercut when the side forms an acute angle (e.g., an angle less than 90°) with the closed end 62. Further, the outer edge 68 of the recess 22 (e.g., the edge formed between the side 58 and the outer surface 26 of the front wall 24) can be radiused or rounded as shown for facilitating the insertion of the insert 30 into the recess. Alternatively, in certain embodiments, the outer edge 68 of the recess 22 can be relatively sharp for improving the retention performance of the insert 30 by increasing the surface area of the side 58 as will be described in more detail below.

Any of various processes can be used for forming the recess 22 in the front wall 24. Generally, the process for forming the recess 22 is largely dependent on the configuration of the base 20. For example, the process for forming the recess 22 in thin-walled applications may be different than thick-walled applications.

Figure 3:
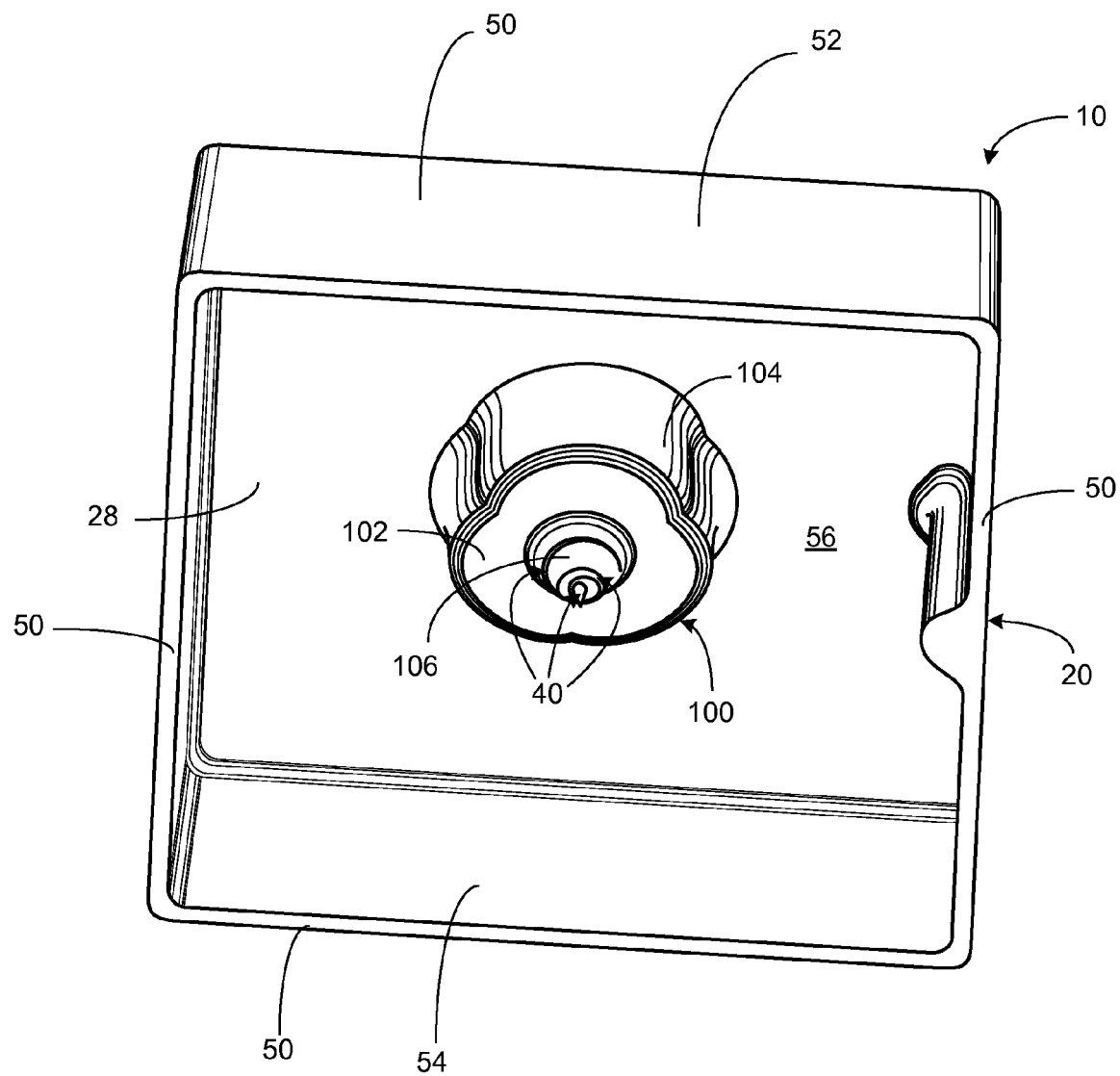
FIG. 3 is a perspective rearward view of the assembled fastener anchor assembly of FIG. 1.

In thin-walled applications (e.g., applications having a relatively thin-walled front wall 24), a boss 100 can be used to facilitate the formation of the recess 22. Referring to FIGS. 2 and 3, the boss 100 is a protrusion extending from the inner surface 28 of the front wall 24 and terminating within the interior cavity 56 of the base 20. The boss 100 includes an end wall 102 and a sidewall 104 extending between the end wall 102 and the inner surface 28 of the front wall 24 of the base 20. In certain implementations, the end wall 102 of the boss is integral (e.g., formed as one piece) with a rear wall of the base to increase the effective thickness and rigidity of the base without adding additional material to the base.

Generally, in thin-wall applications, the recess 22 is defined by the boss 100. More specifically, an outer surface of the end wall 104 and sidewall 102 of the boss 100 defines the closed end 62 and side 58, respectively, of the recess 22. The outer surface of the boss is therefore configured to define a recess 22 having a particular size and shape. In the illustrated embodiments, the sidewall 102 of the boss is formed with three contiguous curved sections and the end wall 104 is formed to extend substantially perpendicular to the sidewall 102. Additionally, the end wall 104 can be formed with a conical-shaped, or other shaped, protrusion 106 with an outer surface that defines the fastener receptacle portion 66 of the recess 22. As illustrated, the inner surfaces of the sidewall 102 and end wall 104 of the boss may have the same features as the outer surface of the sidewall and end wall. However, in other embodiments, the inner surfaces of the sidewall 102 and end wall 104 of the boss do not have the same features as the outer surface of the sidewall and end wall.

In certain implementations, the end and side walls 102, 104 each have the same thickness as the front wall 24 of the base 20. In other implementations, the end and side walls 102, 104 each have a thickness different than the thickness of the front wall 24 of the base 20. Although in the depicted embodiment, the thicknesses of the end and side walls 102, 104 are the same, in other embodiments, the thicknesses of the end and side walls 102 can be different.

In some thin-walled applications, the base 20, including the recess 22 and boss 100, is formed using any of various molding techniques known in the art, such as, for example, blow-molding, injection molding, compression molding, extrusion molding, and rotational molding. Generally, the features of the base 20 are formed by constructing a mold having corresponding features. For blow-molding techniques, the method of making the base 20 may include placing a semi-liquid polymer "parisan" within the mold and injecting a gas into the parisan. The pressure of the gas causes the polymer parisan to spread outwardly and conform to the features of the mold. The conformed polymer is then cooled and removed from the mold with the space occupied by the pressurized gas defining the interior cavity 56 of the base 20. Accordingly, the boss 100, and thus the recess 22, is formed by constructing a protruding feature in the mold that corresponds to the desired size and shape of the boss.

In thick-walled applications, the thickness of the front wall 24 of the base 20 is at least slightly greater than the insert receptacle depth D1 of the recess 22. In these embodiments, the recess 22 is simply cut out of or formed into the front wall 24. Moreover, in certain implementations, the fastener receptacle portion 66 of the recess 22 can be omitted as the fastener 30 can simply be threadably inserted into the material of the front wall 24.

Figure 6:
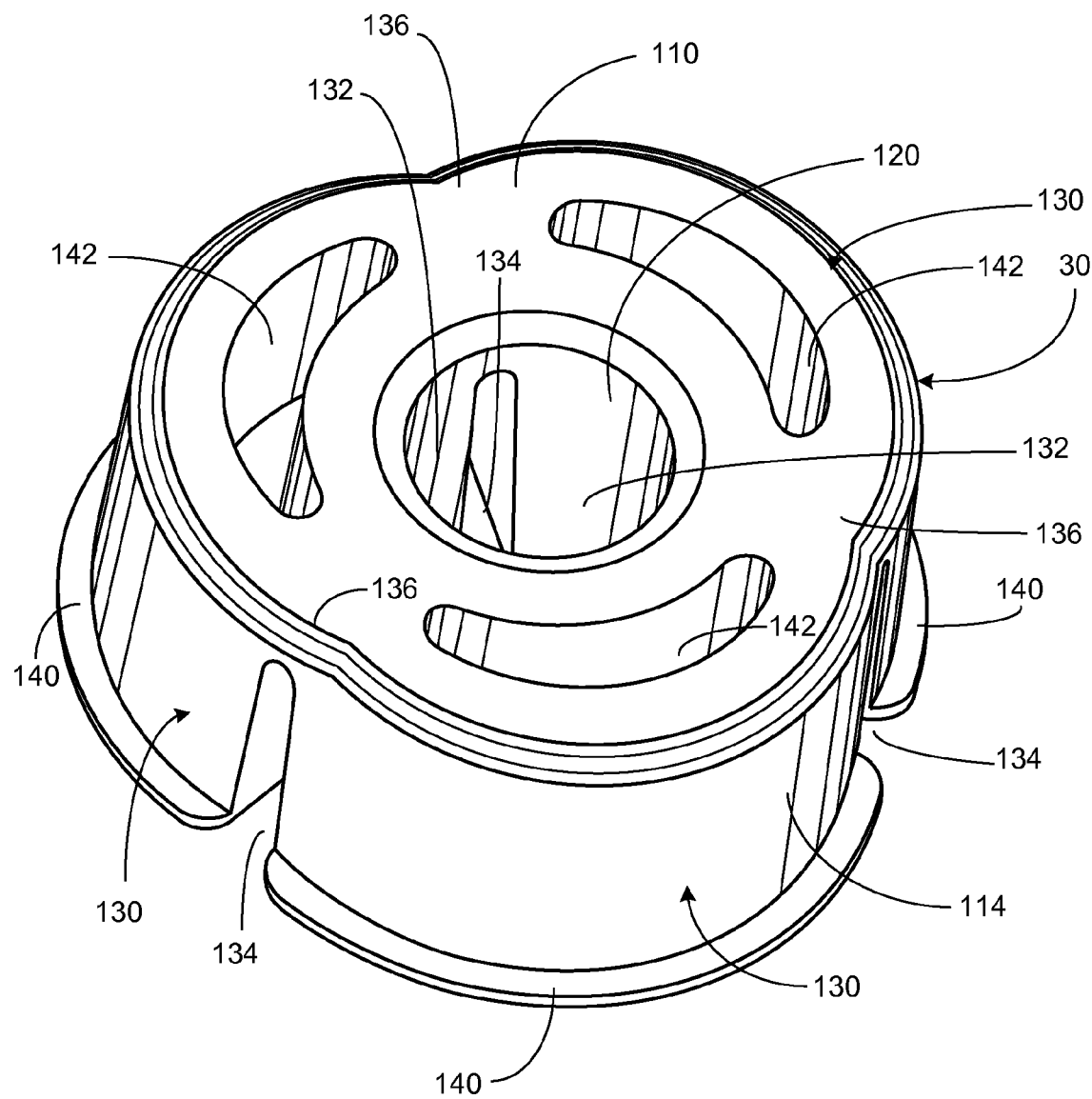
FIG. 6 is a perspective frontal view of an insert according to one embodiment.
Figure 7:
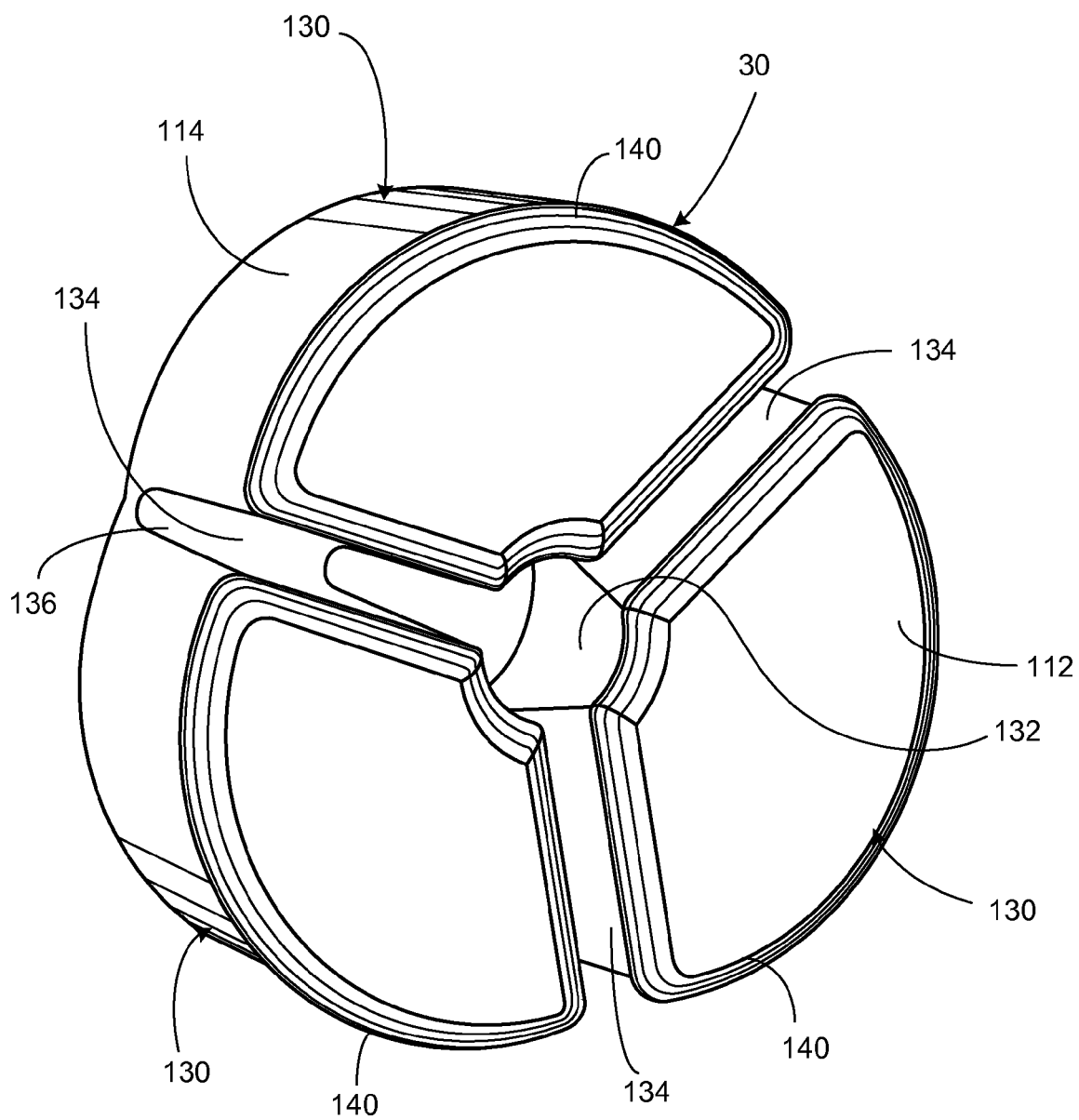
FIG. 7 is a perspective rearward view of the insert of FIG. 6.

Referring now to FIGS. 6 and 7, the insert 30 has a substantially non-circular outer-peripheral shape, or substantially non-circular cross-sectional shape along a plane perpendicular to a central axis of the insert, corresponding with the outer-peripheral or cross-sectional shape of the recess 22. The insert 30 includes an outer surface 110 (see FIGS. 1 and 6) and an inner surface 112 (see FIGS. 2 and 7). Additionally, the insert 30 includes a side surface 114 extending between the outer and inner surfaces 110, 112, respectively. The side surface 114 can extend substantially parallel to a central axis 180 of the insert 30. In certain implementations, the central axis 180 can extend substantially perpendicular relative to the outer and inner surfaces 110, 112. Alternatively, the side surface 114 can extend at an angle relative to the central axis 180. For example, in certain implementations, the side surface 114 is angled with the central axis 180 such that when the lobes 130 are flexed, the side surface 114 is flush (e.g., co-planar) with the side 58 of the recess 22.

In the illustrated embodiment, the insert 30 includes a fastener opening 120 extending substantially parallel to the central axis 180 and three lobes 130 adjacent the opening. Although not in all embodiments, depending on the type of fastener 40 used (e.g., fasteners with substantially non-tapered necks), the fastener opening 120 can be tapered as defined by sidewalls that converge in a direction extending from the outer surface 110 to the inner surface 112 of the insert 30 (see FIG. 2). In other words, the sidewalls of the fastener opening 120 in the illustrated embodiment are angled with respect to the central axis 180. An inlet of the opening co-planar with the outer surface 110 has a diameter greater than a minimum diameter of the threads of the fastener 40. In preferred embodiments, an outlet of the opening co-planar with the inner surface 112 has a diameter less than the minimum diameter of the threads of the fastener 40. In other embodiments, the outlet of the opening need only have a diameter that is less than the maximum diameter of the threads of the fastener 40. Although not shown, for fasteners with substantially tapered necks, the fastener opening 120 can be non-tapered with sidewalls that remain substantially parallel to the central axis 180.

The sidewalls defining the tapered fastener opening 120 are respective central sidewalls 132 of the three lobes 130. The lobes 130, as well as the respective sidewalls 132, are partitioned by a number of slots 134 corresponding with the number of lobes 130. For example, in the illustrated embodiment, the insert 30 includes three slots 134 corresponding to the three lobes 130. Although the central sidewalls 132 of the illustrated insert 30 are smooth, in certain implementations, the central sidewalls 132 can include threads for threadably engaging the threads of the fastener 40. The slots 134 each extend widthwise from the side surface 114 of the insert 30 to the fastener opening 120, and lengthwise from the inner surface 112 of the insert 30 to a location between the inner surface 112 and the outer surface 110. Accordingly, the three lobes 130 are substantially separated from each other by the slots 134 except at a location proximate the outer surface 110 where the lobes are interconnected. The portions of the insert 30 interconnecting the lobes 130 are defined as lobe flex points 136. The thickness of the lobe flex points 136 is selected to provide a desired flexibility of the lobes 130. In alternative embodiments, the lobes 130 are not separated by slots such that each lobe is substantially contiguous with adjacent lobes.

The side surface 114 of the insert 30 defines a substantially non-circular outer-peripheral shape corresponding with the outer-peripheral shape of the recess 22. Moreover, the side surface 114 of the insert 30 is defined as the combined side surfaces of the lobes 130. Accordingly, as shown in FIG. 1, each lobe 130 is sized and shaped to fit within a respective lobe portion 70 of the recess 22. More specifically, the shape of the outer periphery (e.g., side surface) of each lobe 130 is the same as a respective outer periphery of one of the lobe portions 70 of the recess 22. In the illustrated embodiment, the outer peripheral side surface of each lobe 130 is substantially arcuate or curved to correspond with the curvature of the lobe portions 70. The lobes 130 are sized such that a radius of curvature of the lobes is proportional to the radius of curvature of the respective lobe portions 70. In specific implementations, the radius of curvature of the insert lobes 130 is slightly smaller than the radius of curvature of the recess lobe portions 70.

Figure 8:
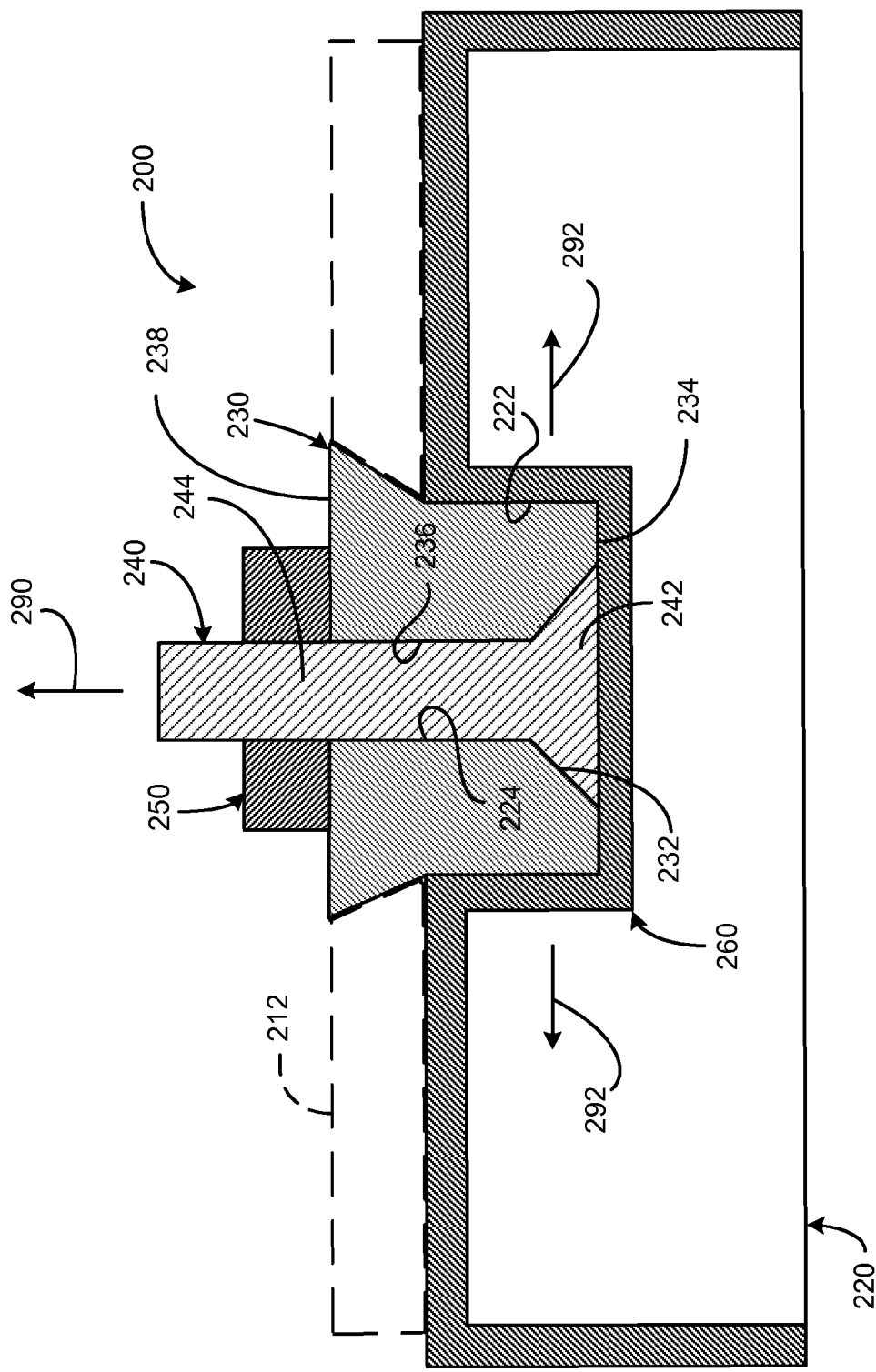
FIG. 8 is a cross-sectional side view of an assembled fastener anchor assembly according to another embodiment.

In an unflexed state, the insert 30 is configured to be inserted into the recess 22 without substantial interference in some embodiments. For example, a maximum width of the insert 30 can be less than the width W of the recess 22. Also, in some embodiments, the outer surface 110 of the insert 30 sits flush with or is inset relative to (e.g., below) the outer surface 26 of the front wall 24 of the base 20. Accordingly, in these embodiments, a total height of the insert 30 is equal to or less than the insert receptacle depth D1 of the recess 22 in some embodiments. Of course, in other embodiments, the recess 22 and insert 30 can be configured such that insertion of the insert 30 into the recess 22 is met with some resistance or interference (e.g., to partially retain the insert in place during assembly). Also, in other embodiments, such as to assist in locating a component 212 or for use in shear force applications, the insert can extend above the outer surface 26 of the front wall 24 when seated within the recess (e.g., see FIG. 8).

As discussed above, the configuration of the insert 30 corresponds with the configuration of the recess and vice versa. Therefore, as can be recognized, the lobes 130, like the recess 22, can have any of various sizes and shapes without departing from the essence of the present disclosure. For example, the lobes 130 need not have an arcuate side surface 114 as illustrated where the recess 22 does not have arcuate sides. Additionally, the insert 30 may have more or less than three lobes 130 in some embodiments where the recess 22 has more or less than three lobes.

As shown in FIGS. 6 and 7, the insert 30 can have recess engaging features, such as lips 140. As shown, each lobe 130 includes a respective lip 140 that extends across an outer periphery of the lobe. More specifically, each lip 140 extends substantially transversely away from the side surface 114 of a respective lobe 130 proximate the inner surface 112 of the insert. Generally, the lips 140 are configured to penetrate the side 58 of the recess 22 as the insert 30 is secured to the base 20 via actuation of the fastener 40 as will be described in more detail below. Accordingly, in some embodiments, the lips 140 each include a relatively sharp peripheral edge to facilitate the penetration of the lip into the side 58 of the recess 22.

Although the insert 30 of the illustrative embodiment includes three lips 140 each associated with a respective lobe 130 and positioned proximate the inner surface 112, in other embodiments, the insert can include fewer or more than three lips, or other recess engaging features, positioned at any of various locations on the side surface 114 of the insert. For example, in certain implementations, each lobe 130 may include a plurality of lips 140 spaced apart along the side surface 114. Moreover, the recess engaging features on the respective lobes 130 need not be identically sized and shaped, and each lobe 130 need not have the same number of recess engaging features. For example, each lobe 130 can have any combination of lips 140, spikes, ridges, tabs, and other recess engaging features.

In the illustrated embodiment, each lobe 130 of the insert 30 includes a pocket 142 open to the outer surface 110 of the insert. The pockets 142 are a product of one possible method of manufacturing the insert 30. In certain embodiments, the insert 30 can be manufactured without the pockets 142. The insert 30, as well as the base 20, can be made from any of various plastic and non-plastic materials. In certain embodiments, the insert 30 and base 20 are made from a relatively hard plastic material, such as Deiron®, Nylon®, polyethelyne, polypropelyne, and/or other polymers.

Referring back to FIGS. 1 and 2, the fastener 40 can be any of various fasteners having a head portion 42 and a threaded portion 44. Preferably, the fastener 40 is made from a material that is harder than the material of the base 20 and insert 30. For example, the base 20 and insert 30 can be made from a plastic and the fastener 40 can be made from a harder plastic, metal, or metal alloy (e.g., steel). The fastener 40 can have any of various thread sizes, pitches, and sharpness. Likewise, with a plastic base 20 and insert 30, the sharper the threads, the easier the insertion force, but the lower the retention force. Alternatively, the fastener 40 can be a substantially threadless fastener, such as a pin or a rivet.

Referring to FIGS. 1-4, the fastener anchor assembly 10 is assembled by inserting the insert 30 into the recess 22 with the inner surface 112 of the insert facing the closed end 62, and the lobes 130 of the insert being positioned within a respective lobe portion 70 of the recess. When properly inserted, the inner surface 112 of the insert 30 abuts the closed end of the recess in some embodiments. Although the insert 30 may engage the side 58 of the recess 22 to partially retain the insert within the recess, without the fastener being engaged with the insert, the insert can be easily removable from the recess. With the insert 30 seated within the recess 22, the component 12 to be secured to the base 20 is positioned over the insert such that a hole in the component aligns with the fastener opening 120 of the insert 30.

The fastener 40 is then inserted through the hole in the component 12 and into the fastener opening 120 of the insert. The fastener 40 is then rotatably driven into the fastener opening 120 using a fastening tool, such as a screwdriver or wrench, until the threads of the fastener 40 at least partially threadably engage the central sidewalls 132 of the lobes 130 of the insert 30. For smooth central sidewalls 132, threadable engagement between the threads of the fastener 40 and the central sidewalls 132 involves the threads of the fastener at least partially penetrating and deforming the central sidewalls (see FIG. 2) as the fastener is rotated. For threaded central sidewalls, threadable engagement involves the threads of the fastener 40 threadably engaging the threads of the central sidewalls. The insert 30 is prevented from rotating within the recess 22 while the fastener 40 is rotatably driven due to the non-circular nature of the recess and insert. In other words, the fastener anchor assembly 10 ensures that the fastener 40 is rotated relative to the insert 30 because the walls of the lobe portions 70 of the recess 22 obstruct the rotation of the insert when seated within the recess.

It is noted that for threadless fasteners, the fastener can be non-rotatably driven into the insert. For example, in certain implementations, a threadless fastener can be driven by applying a large impact force to the fastener using a pounding tool, such as a hammer, mallet, or other similar tool.

As the fastener 40 is driven through the fastener opening 120 of the insert, the threads of the fastener (or sides of the fastener in threadless fastener applications) apply a laterally directed force against the central sidewalls 132 of the lobes 130 due to the converging nature of the fastener opening. The laterally directed force effectively pushes against the lobes 130 to move the lobes radially outward away from each other as indicated by directional arrows 190. Radially outward movement of the lobes is facilitated by the relatively thin lobe flex points 136. As the lobes 130 move radially outward, the lobes contact and apply a radially outward directed pressure against the wall 58 of the recess to effectively form a press-fit coupling with the recess. In certain implementations, the range of radially outward movement of the lobes 130, and thus the applied pressure, is dependent upon the size of the threads. Generally, the larger the diameter of the threads, the greater the displacement of the lobes 130 and the applied pressure.

In an alternative embodiment, the lobes of an insert can be moved radially outward into contact with the walls of a recess in a manner different than that described in association with the embodiment shown in FIGS. 1-7. For example, referring to FIG. 8, a fastener anchor assembly 200 includes a base 220, an insert 230, and a fastener 240. The base 220 includes a recess 222 formed by a boss 260 similar to the recess 22 and boss 100 of base 20. However, the recess 222 does not include a fastener retention portion and the boss 260 does not include a conical-shaped protrusion. The insert 230 can include a fastener opening 224 and lobes adjacent the opening. The lobes can be configured to define a circular or non-circular outer periphery of the insert 230 as described above. However, the fastener opening 224 includes a fastener head portion 232 formed in an inner surface 234 of the insert 230 and a fastener neck portion 236 extending between the fastener head portion and the outer surface 238. The fastener opening 224 is configured to receive the fastener 240 such that the head 242 of the fastener is positioned within the fastener head portion 232 of the fastener opening 224 and the threaded or unthreaded neck 244 of the fastener is positioned within the fastener neck portion 236. As shown, the head 242 of the fastener 240 is a tapered head and the fastener head portion 232 is defined by correspondingly tapered sidewalls.

In the illustrated embodiment, when the fastener 240 is properly positioned within the fastener opening 224, a portion of the neck 244 extends outwardly away from the outer surface 238 of the insert 230. The fastener anchor assembly 200 further includes a fastener coupling (e.g., nut 250) configured to engage (e.g., threadably engage) the exposed portion of the fastener neck 244. As the nut 250 is tightened along the fastener neck 244, the spacing between the head 242 of the fastener 240 and the nut is reduced until the nut is urged against the outer surface 238 of the insert 230, and the head is urged against the surface of the insert 230 defining the fastener head portion 232 of the opening 224. Further tightening of the nut 250 urges the fastener 240 outwardly (e.g., upwardly) relative to the insert 230 as indicated by directional arrow 290. The outward urging of the fastener 240 applies an outwardly directed force on the surface of the insert 230 defining the fastener head portion 232. Due to the corresponding angled surfaces of the fastener head 242 and fastener head portion 232, the applied outwardly directed force translates into radially outwardly directed movement of the lobes as indicated by directional arrow 292. More specifically, as the fastener 240 is drawn upwardly, the head portion 232 of the fastener pushes (e.g., spreads) the lobes of the insert radially outward.

Similar to the lobes 130 of the insert 30, as the lobes 130 of insert 230 move radially outward, the lobes contact and apply a radially outward directed pressure against the wall of the recess 222. Accordingly, in contrast to spreading the lobes of the insert by moving a fastener in an outward-to-inward direction relative to the insert as with the fastener anchor assembly 10, the fastener anchor assembly 200 spreads the lobes by moving a fastener in an inward-to-outward direction relative to the insert. Put another way, the fastener anchor assembly 10 is configured to spread the lobes from the top (e.g., outside) and the fastener anchor assembly 200 is configured to spread the lobes from the bottom (e.g., inside).

The radially outward pressure (i.e., normal/perpendicular force) applied against the wall 58 by the lobes 130 increases the retention force of the insert 130. In other words, the radially outward pressure increases the negative draft or force-fit (e.g., press-fit) interference between the side surface 114 of the insert 30 and the wall 58 of the recess 22, which increases the force necessary to pull the insert out from the recess. Generally, the more uniform the distribution of the normal force across the surface of the recess wall 58, the greater the retention force. Accordingly, in certain embodiments, the shape of the recess 22 and insert 30 is selected to achieve desired normal force distribution uniformity.

Further, the retention force (including the force fit interference) of the assembly 10 can be increased by increasing the surface area of the insert side surface in contact with the recess wall. Accordingly, using a sharp outer edge 68 instead of a rounded or beveled edge can increase the retention force by increasing the surface area of the insert side surface and recess wall in contact with each other. Additionally, the surface area of the insert and recess in contact with each other can be increased by increasing the height of the insert and depth of the recess, and/or increasing the size of the outer periphery of the insert and recess. Accordingly, in some embodiments without undercutting the sides of the recess 22 and inserts with recess engaging features, the retention force between the insert and recess is provided solely by a force-fit interference between the outer surfaces of the insert and recess. In other words, in certain embodiments without undercutting the sides of the recess 22 and inserts with recess engaging features, the retention force between the insert and recess is provided solely by the force-fit interference between the sidewall and recess while the sidewall of the recess 22 remains perpendicular relative to at least the open end 60 of the recess and the outer surface of the insert remains parallel to the sidewall of the recess (i.e., perpendicular to the open end).

In alternative embodiments, the retention force of the assembly 10 is further increased by undercutting the side 58 of the recess. Undercutting the side 58 would require substantial deformation of the base 20 and/or insert 30 to occur before the insert can be removed from the recess 22. Therefore, more force would be required to remove the insert 30 (and fastener 40) from the recess 22.

For inserts having recess engaging features, such as lips 140, as the lobes 130 are moved radially outwardly, the recess engaging features penetrate the wall 58 of the recess 22. This engagement between the recess engaging features and the wall 58 of the recess 22 increases the retention force of the assembly 10 by provided increasing grip and traction for resisting pull-out of the insert relative to the recess.

In addition to the increased radially outward directed pressure against the recess wall and engagement between the recess engaging features and the recess, threadable engagement between the fastener 40 and the conical-shaped protrusion 106 can increase the retention force of the assembly 10 (see FIGS. 2 and 3). The fastener 40 can be rotatably driven through the fastener opening 120 of the insert 20 and into threadable engagement with the conical-shaped protrusion 106 of the boss 100. More specifically, as the fastener 40 is rotatably driven, the threads of the fastener penetrate and deform the conical-shaped protrusion 106, which increases the resistance to pull-out of the fastener and thus the insert 20.

In the illustrated embodiment, the insert 30 has a one-piece monolithic construction. For example, each of the lobes 130 are interconnected by the flex points 136. However, in alternative embodiments, the flex point 136 can be omitted such that each lobe 130 forms a separate and independent piece. In other words, each lobe 130 can have a one-piece monolithic construction independent of the other lobes. In such an embodiment, the fastener anchor assembly is assembled by separately placing each of the lobe pieces into a respective lobe portion of the recess about the conical-shaped protrusion. The radially inward surfaces of the individual lobe pieces define a fastener opening through which a fastener is insertable. The fastener 40 is then forcibly driven through the fastener opening defined between the lobe pieces to move the pieces radially outward away from each other against the wall of the recess.

Further, although the above embodiments of the fastener anchor assembly include a non-circular recess and a corresponding non-circular insert, in other embodiments a circular recess and circular insert can be used. The circular insert can include lobes similar to the lobes 130 of the insert 30 except that the side surface 114 of the lobes defines a substantially circular shape instead of a multi-lobular or non-circular shape. As discussed above, the non-circular nature of the recess 22 and insert 30 prevents rotation of the insert relative to the recess. Therefore, for embodiments employing a circular recess and insert, the insert and/or recess can include rotation prevention features, such as teeth, grooves, and/or ridges, that prevent rotation of the insert relative to the recess. In these embodiments, the insert can be at least partially forcibly inserted into the recess such that the rotation prevention features at least partially penetrate and grip the wall of the recess. When a fastener 40 is forcibly inserted through the insert, the lobes of the circular insert press against the wall of the recess to retain the insert in the recess in the same manner as described above.

Reference throughout this specification to "one embodiment," "an embodiment," or similar language means that a particular feature, structure, or characteristic described in connection with the embodiment is included in at least one embodiment of the present subject matter. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more particular embodiments of the present subject matter. However, absent an express correlation to indicate otherwise, an implementation also may be associated with one or more other embodiments of the present subject matter.

The present subject matter may be embodied in other specific forms without departing from its spirit or essential characteristics. The described embodiments are to be considered in all respects only as illustrative and not restrictive. The scope of the disclosed subject matter is, therefore, indicated by the appended claims rather than by the foregoing description. All changes which come within the meaning and range of equivalency of the claims are to be embraced within their scope.

What is claimed is:

1. A fastener anchor assembly for securing a fastener, comprising:
a base;
a recess formed in the base, the recess having a substantially non-circular cross-sectional shape; and
an insert having a substantially non-circular cross-sectional shape corresponding with the non-circular cross-sectional shape of the recess, the insert being positionable within the recess, the insert comprising a fastener opening and at least one flexible portion, wherein the at least one flexible portion flexes to engage the recess as a fastener moves through the fastener opening;
wherein the base comprises a boss, and wherein the recess is formed in the boss, and
wherein the boss comprises a substantially conically shaped protrusion, wherein the recess comprises a substantially conically shaped portion defined by the substantially conically shaped protrusion of the boss, the conically shaped portion being configured to receive the fastener, and wherein the fastener is engageable with the substantially conically shaped protrusion of the boss.

2. The fastener anchor assembly of claim 1, wherein the recess has a multi-lobular shape and the insert has a corresponding multi-lobular shape.

3. The fastener anchor assembly of claim 2, wherein the at least one flexible portion comprises multiple lobes, and wherein the multiple lobes are outwardly flexible away from each other.

4. The fastener anchor assembly of claim 1, wherein the recess comprises an open end, an opposing closed end, and a sidewall extending between the open and closed ends, and wherein the sidewall diverges in a direction extending from the open end to the closed end.

5. The fastener anchor assembly of claim 1, wherein the at least one flexible portion comprises an outer surface and the recess comprises an inner surface, wherein the outer surface of the at least one flexible portion presses against the inner surface of the recess to engage the recess.

6. The fastener anchor assembly of claim 1, wherein the insert comprises at least one lip extending about a periphery of the insert, and wherein the lip penetrates a wall of the recess to engage the recess.

7. The fastener anchor assembly of claim 1, wherein the base comprises a substantially hollow panel defining an interior cavity, the panel comprising a boss extending into the interior cavity, and wherein the recess is formed in the boss.

8. The fastener anchor assembly of claim 1, wherein the base and insert are made from a substantially rigid plastic material.

9. The fastener anchor assembly of claim 1, wherein when positioned within the recess, the insert is prevented from rotating relative to the recess.

10. The fastener anchor assembly of claim 1, further comprising a nut that is threadably engageable with the fastener to urge the fastener through the fastener opening.

11. The fastener anchor assembly of claim 1, wherein the at least one flexible portion comprises a plurality of lobes defining the substantially non-circular cross-sectional shape, the plurality of lobes being outwardly movable away from each other and the fastener opening.

12. The fastener anchor assembly of claim 11, wherein the plurality of lobes comprises at least two interconnected lobes.

13. The fastener anchor assembly of claim 12, wherein each of the plurality of lobes comprises a substantially arcuate outer periphery.

14. The fastener anchor assembly of claim 11, wherein each of the plurality of lobes comprises a separate one-piece component.

* * * * *